Dec. 3, 1940.   P. L. BOJESEN   2,223,716
GEAR CHANGE MECHANISM
Filed Dec. 20, 1938
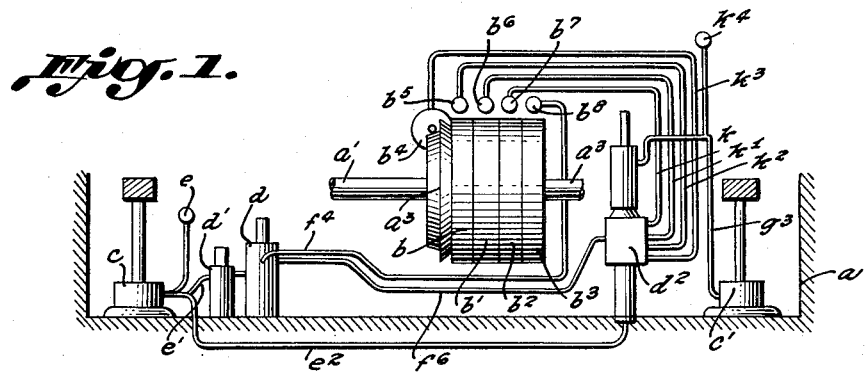
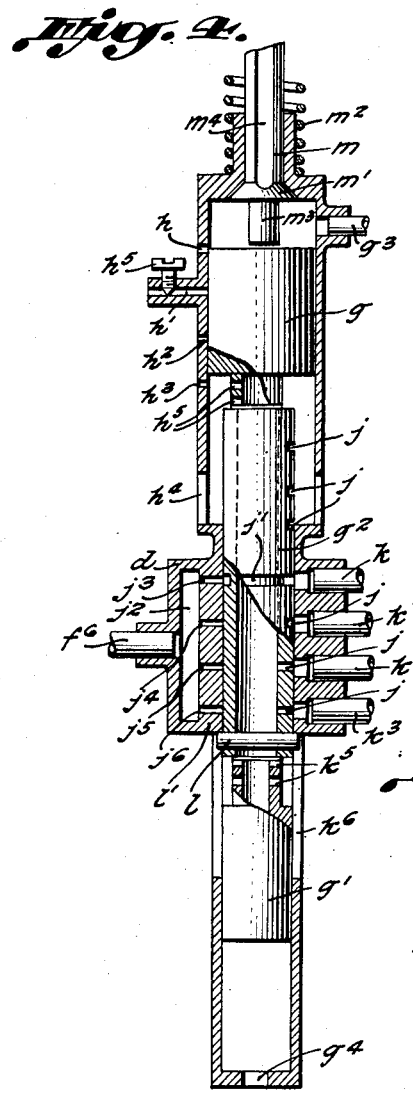
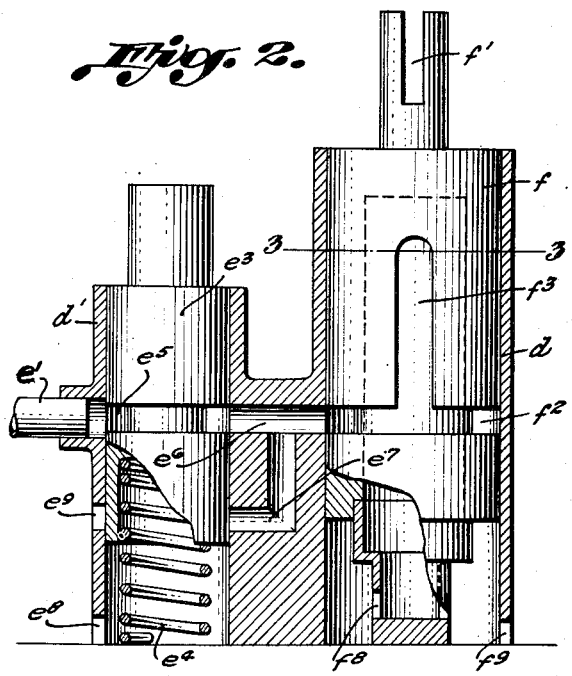
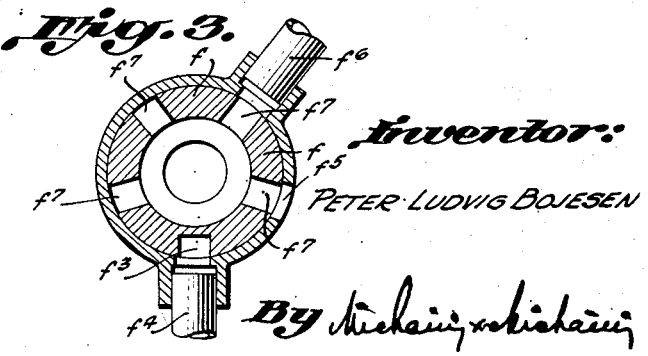
Inventor:
PETER LUDVIG BOJESEN
By Michaus & Michaus
Attorneys Patented Dec. 3, 1940

2,223,716

UNITED STATES PATENT OFFICE 2,223,716

GEAR CHANGE MECHANISM

Peter Ludvig Bojesen, Shanghai, China

Application December 20, 1938, Serial No. 246,841
In Great Britain April 11, 1938

6 Claims. (Cl. 74—262)

My invention relates to improvements in gear change mechanism and applies to an epicyclic gear of the type in which different gear ratios are provided by braking or clutching various elements of the gear in succession.

According to this invention the change gear means include an epicyclic gear giving a number of forward speeds and reverse and means hydraulically operated for causing the various gears to come into operation in succession, such last mentioned means including two hydraulic pumps, one driven synchronously with the engine and the other driven synchronously with the road wheels, a forward gear selector, a communication from the selector to each of the forward gears, a piston valve in such selector, a communication from the pump driven synchronously with the road wheels to the said piston which causes the same to move to open in succession the communications to each of the forward gears, the piston moving in dependence on the pressure of liquid delivered by the said pump, a master selector and communication from the pump driven by the engine to the master selector, communications from the master selector to the forward gear selector and to the reverse gear, means for operating the master selector so as to connect the said pump either to the reverse gear or to the forward gear selector, and means for allowing liquid to drain from the communications not connected to the said pump, the liquid from the said pump when connected to the forward gear selector operating to cause engagement of the forward gear selected by the said forward gear selector.

The first mentioned selector may be as described in my concurrent application Serial No. 246,840 or may be of other convenient form.

A valve under the control of the driver may be interposed between the second mentioned pump and the master selector to connect or disconnect the supply of liquid from the master selector, thus operating in a manner similar to the normal clutch on an automobile.

Preferably all the parts may be contained in a gear box which contains oil which serves both to lubricate the gears and as an hydraulic operating fluid to cause engagement of the gears.

The gear braking elements may be as described in my concurrent application Serial No. 246,840.

An example of this invention is illustrated diagrammatically in the accompanying drawing in which:

Figure 1 shows the interior of a gear box.

Figure 2 is a view partly in section of the master plunger and clutch valve.

Figure 3 is a section on the line 3—3 of Figure 2 and Figure 4 is a section through the forward gear selector.

Figures 2, 3 and 4 are on a larger scale than Figure 1.

$a$ is the gear box of an automobile, $a^1$ the driving shaft driven from the engine of the automobile (not shown) and $a^3$ the driven shaft connected to the wheels of the automobile (not shown).

The driving and driven shafts are adapted to be coupled together through an epicyclic gear, which gives four forward speeds and a reverse, the highest of the forward speeds being the direct drive engaged by a clutch indicated at $a^3$. The other three forward gears and the reverse gear are adapted to be engaged by braking or clutch elements which may be as described in my concurrent application Serial No. 246,840 and which are indicated at $b$, $b^1$, $b^2$, and $b^3$, the last being the reverse gear. All the gears are adapted to be engaged by plungers operating in cylinders, the five cylinders being indicated at $b^4$ for the direct drive, $b^5$ for the next highest gear, $b^6$ for the next gear, $b^7$ for the lowest gear and $b^8$ for the reverse gear.

Two pumps are provided at $c$ and $c^1$, the former driven from the driving shaft $a^1$ and the latter from the driven shaft $a^2$.

Also arranged in the gear box is a master selector shown at $d$, a valve hereinafter called "the clutch valve" shown at $d^1$ and a forward gear selector shown at $d^2$. All these parts are immersed in the gear box, the same oil serving to lubricate the parts as is delivered by the pumps to engage the gears in a manner hereinafter described.

Oil is delivered from the pump $c$ driven by the engine through three conduits, one leading to a relief valve $e$, the second $e^1$ leading to the clutch valve $d^1$ and the third $e^2$ leading to the forward gear selector $d^2$.

The clutch valve consists of a cylinder in which is a piston $e^3$ urged upwards by a spring $e^4$ and adapted to be depressed against the reaction of the spring by the driver's foot. In the normal position a groove $e^5$ comes in register with the pipe $e^1$ leading from the pump $c$ and the conduit $e^6$ leading to the master selector $d$. When the foot is depressed these two conduits will be closed by the upper part of the piston and oil can flow back to the gear box from the master selector $d$ through a conduit $e^7$ and hole $e^9$ which will then be placed in communication by the groove $e^3$. An additional drain hole $e^6$ is provided. The master selector $d$ consists of a cylinder having in it a piston $f$ adapted to be rotated by manual operation of the driver for which purpose a lever (not shown) engages in a groove $f^1$ to an extension on the cylinder $f$.

Oil which is delivered from the pump $c$ via pipe $e^1$, annular recess $e^5$ and conduit $e^6$ enters an annular recess $f^2$ in the cylinder $f$ and thence flows upwards through a groove $f^3$. By a rotation of the piston $f$ groove $f^3$ can be brought successively opposite three exits from the cylinder.

In the position shown in Figure 3 the top of groove $f^3$ is in register with a pipe $f^4$ which leads to the reverse operating mechanism $b^8$. By rotating the piston anti-clockwise the groove $f^3$ can be brought in register with a hole $f^5$ leading back to the gear box. In this case the master selector is at neutral. Further rotation anti-clockwise will bring groove $f^3$ in register with the pipe $f^6$ which leads to the forward gear selector $d^2$. Whenever the groove $f^3$ is in register with $f^4$ or the conduit $f^6$, the other of these conduits will be in communication with the gear box via the hollow interior of the cylinder $f$, and five holes shown at $f^7$ which communicate the hollow interior with the outside of the piston. The hollow interior also drains back to the gear box through holes $f^8$ and $f^9$.

The forward gear selector is illustrated in Figure 4 and consists of a cylinder $d^2$ of varying diameter; the under side operates a piston which may be constructed in three parts, a piston $g$, a piston $g^1$ and a piston valve $g^2$ forming the parts between these two pistons. Oil is communicated to the top end of the cylinder from pump $c^1$ via pipe $g^3$ and to the bottom end of the cylinder from pump $c$ and pipe $e^2$ through hole $g^4$. From the part of the cylinder $d$ in which reciprocates the piston $g$ there are a series of holes $h$, $h^1$, $h^2$, $h^3$ and $h^4$ communicating with the interior of the gear box. Holes $h$, $h^1$, $h^2$ and $h^3$ are all formed as illustrated with regard to the hole $h^1$ as gauged holes, the size of which can be controlled by screws one of which is shown at $h^5$. The piston valve $g^2$ has six holes $j$ communicating with its hollow interior and an annular recess $j^1$. In the central part of the selector is formed a chamber $j^2$ with which the pipe $f^6$ communicates. A series of holes $j^3$, $j^4$, $j^5$ and $j^6$ lead from this chamber $j^2$ to the interior of the cylinder in which the piston valve $g^2$ reciprocates and a series of conduits $k$, $k^1$, $k^2$ and $k^3$ in register with these holes communicate with the plungers operating the first, second, third and fourth or direct gear.

These conduits are also shown in Figure 1 where a relief valve $k^4$ for the pump $c^1$ is shown, this valve being arranged to open at a higher pressure than the relief valve $e$. The hollow interior of the piston valve $j$ communicates with the interior of the gear box through holes $k^5$ in the wall of the valve and a hole $k^6$ in the wall of the cylinder.

The way the forward selector works is as follows: Oil supplied by pump $c$ through hole $g^4$ urges piston $g^1$ upward. This upward displacement is limited by a pin $l$, the ends of which come into contact with shoulder $l^1$. At the same time oil supplied from pump $c^1$ through pipe $g^3$ urges the piston $g$ downward.

The pressure delivered by the two pumps $c$ and $c^1$ will be dependent upon the setting of the relief valves $e$ and $k^4$. Relief valve $k^4$ is set to open at a higher pressure than relief valve $e$.

Suppose the master selector be set to supply oil through pipe $f^6$ and suppose relief valve $e$ be set to open at a pressure of 50 lbs. and relief valve $k^4$ at 100 lbs. When pump $c^1$ is not in operation piston $g$ will be in its upper position. When the pump starts up there will momentarily be a pressure of 100 lbs. upon piston $g$ since no outlet is provided, but as soon as port $h$ is uncovered the pressure will fall and assuming that the pump is then only delivering sufficient to maintain the 50 lbs. pressure with port $h$ open the piston will remain in this position. When the delivery from the pump increase, piston $g$ will again be moved down until the port $h^1$ is open and will remain in this position until the pump is delivering a pressure which goes above 50 lbs. notwithstanding the leak provided by ports $h$ and $h^1$. When ports $h$, $h^1$, $h^2$ and $h^3$ have been opened they will be sufficient to relieve the whole of the difference of pressure between the relief valves $k^4$ and $e$.

Thus as the road wheel speed progressively increases the piston $g$ moves down in steps stopping in positions when the ports $h$, $h^1$, $h^2$ and $h^3$ respectively are opened. Each of these steps brings groove $j^1$ in register with one of the conduits $k$, $k^1$, $k^2$ and $k^3$ and a higher speed is progressively enjoyed. In any case the conduits not in register with the groove $j^1$ will be drained through one of the holes $j$.

When the road wheel speed falls the pressure from pump $c^1$ will momentarily fall, allowing pump $c$ acting on piston $g^1$ to return the piston valve to engage a lower gear, piston $g$ taking up a position in which the pressures on pistons $g$ and $g^1$ are again balanced.

Superimposed upon the automatic selection by the forward gear selector are means for manual selection. These consist of a member $m$ having a mushroom shaped head $m^1$ normally seating in the top of the selector cylinder. The member $m$ is adapted to be depressed against the reaction of a spring $m^2$ when an extension $m^3$ will bear on piston $g$ and displace this piston and a piston valve $g^2$ accordingly downward. The space at the top of the piston $g$ is then vented to the interior of the gear box through grooves $m^4$ in the side of the member $m$, so that oil delivered from pump $c^1$ will escape idly until the member $m$ is returned under the influence of spring $m^2$ to its original position. When this takes place the driver can select any gear at will by operation of member $m$.

I claim:

1. Change gear means for an automobile having road wheels and an engine driving the wheels, comprising an epicyclic gear giving a number of forward speeds and reverse and means hydraulically operated for causing the various gears to come into operation in succession, such last mentioned means including two hydraulic pumps, one driven synchronously with the engine and the other driven synchronously with the road wheels, a forward gear selector, a communication from the selector to each of the forward gears, a piston valve in such selector, a communication from the pump driven synchronously with the road wheels to the said piston which causes the same to move to open in succession the communications to each of the forward gears, the piston moving in dependence on the pressure of liquid delivered by the said pump, a master selector and communication from the pump driven by the engine to the master selector, communications from the master selector to the forward gear selector and to the reverse gear, means for operating the master selector so as to connect the said pump either to the reverse gear or to the forward gear selector, and means for allowing liquid to drain from the communications not connected to the said pump, the liquid from the said pump when connected to the forward gear selector operating to cause engagement of the forward gear selected by the said forward gear selector.

2. Change gear means as claimed in claim 1 in which the epicyclic gear, the two pumps and the two selectors are all contained in a gear box which contains oil which serves both to lubricate the gears and as a hydraulic operating fluid to cause engagement of the gears.

3. Change gear means for an automobile having road wheels and an engine driving the wheels, comprising an epicyclic gear giving a number of forward speeds and reverse and means hydraulically operated for causing the various gears to come into operation in succession, such last mentioned means including two hydraulic pumps, one driven synchronously with the engine and the other driven synchronously with the road wheels, a forward gear selector, a communication from the selector to each of the forward gears, a piston valve in such selector, a communication from the pump driven synchronously with the road wheels to the said piston which causes the same to move to open in succession the communications to each of the forward gears, the piston moving in dependence on the pressure of liquid delivered by the said pump, a master selector comprising a cylinder and a piston rotatable therein, passages through the said piston and passages from the said cylinder so that in one position of the said piston the said pump is connected to the reverse gear and liquid is allowed to drain from the communication to the forward gear selector, in another position liquid is connected to the forward gear selector and is allowed to drain from the reverse gear, and in a third position liquid is communicated neither to the reverse gear nor to the forward gear selector, the liquid from the said pump when connected to the forward gear selector operating to cause engagement of the forward gear selected by the said forward gear selector.

4. Change gear means as claimed in claim 3 in which the piston of the master gear selector has a hollow interior and a number of holes through its wall connecting the exterior of the piston with the interior thereof which serve as drainage holes for the liquid from the communication not being supplied by the pump.

5. Change gear means for an automobile having road wheels and an engine driving the wheels, comprising an epicyclic gear giving a number of forward speeds and reverse and means hydraulically operated for causing the various gears to come into operation in succession, such last mentioned means including two hydraulic pumps, one driven synchronously with the engine and the other driven synchronously with the road wheels, a forward gear selector, a communication from the selector to each of the forward gears, a piston valve in such selector, a communication from the pump driven synchronously with the road wheels to the said piston which causes the same to move to open in succession the communications to each of the forward gears, the piston moving in dependence on the pressure of liquid delivered by the said pump, a master selector and communication from the pump driven by the engine to the master selector, communications from the master selector to the forward gear selector and to the reverse gear, means for operating the master selector so as to connect the said pump either to the reverse gear or to the forward gear selector, means for allowing liquid to drain from the communications not connected to the said pump, the liquid from the said pump when connected to the forward gear selector operating to cause engagement of the forward gear selected by the said forward gear selector, a valve adapted to be operated by the driver in the passage way between the said engine driven pump and the master selector adapted in one position to open a communication between the pump and the master gear selector and in another position to close this communication.

6. Change gear means as claimed in claim 5, wherein said valve consists of a cylinder, a piston therein and resilient means urging the piston in one direction axial of the cylinder against which means the piston is displaceable by the driver.

PETER LUDVIG BOJESEN.